April 25, 1944.                 W. PUTTFARCKEN                 2,347,612
                        DEVICE FOR CONTROLLING POWER CIRCUITS
                                Filed Dec. 26, 1940
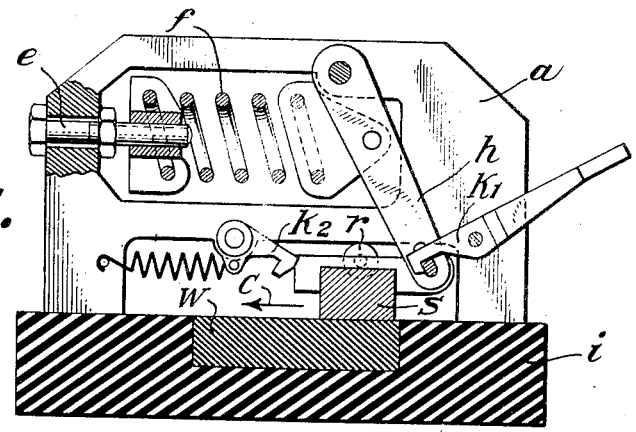
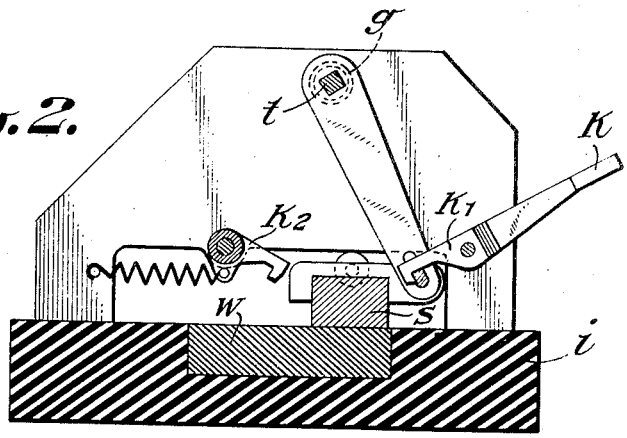
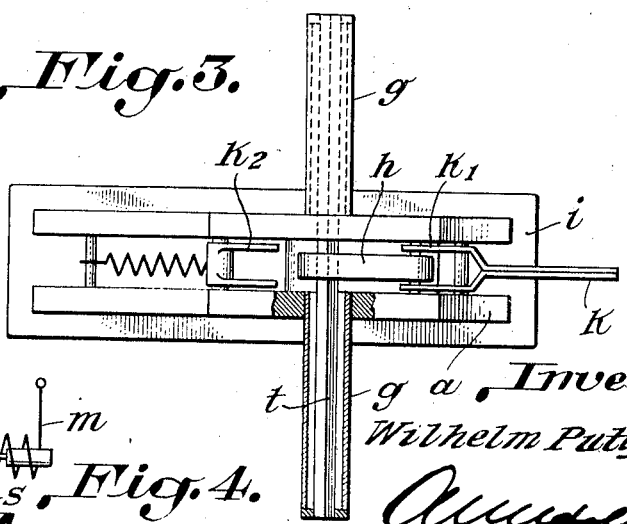
Inventor.
Wilhelm Puttfarcken,
By
Attorney.

Patented Apr. 25, 1944

2,347,612

UNITED STATES PATENT OFFICE 2,347,612

DEVICE FOR CONTROLLING POWER CIRCUITS

Wilhelm Puttfarcken, Berlin-Spandau, Germany; vested in the Alien Property Custodian Application December 26, 1940, Serial No. 371,843
In Germany June 30, 1930

5 Claims. (Cl. 201—62)

This invention relates to apparatus for controlling power circuits. According to the invention, a continuously variable resistance device lying in the circuit to be controlled is provided with an energy-accumulating device serving to drive and to brake the movable part of the resistance device, and the energy-accumulating device is arranged in such a manner that it is unloaded in the approximate center of the path of the movable part and acts in the first portion of this path as a driving device and in the second portion thereof as a braking device.

The interruption of the power circuit is preferably effected in the manner that the resistance device, when in operation, increases its resistance magnitude rapidly from a small steady value to a great value at which the residual current is either negligible or may easily be interrupted by a circuit breaker of small interrupting capacity. In the first case, the apparatus according to the invention serves to effect the switching operation and in the second case to initiate the same. The movable part of the resistance device is displaced in the shortest possible time, approximately in the order of magnitude of a millisecond, from the one end position to the other without mechanically or electrically overstressing the device. A uniform switching operation in electrical respect is ensured by the use of a resistor with a continuously varying resistance characteristic, and the speed of actuation mentioned above may be brought about by means of an energy-accumulating device. Since the latter acts both as a driving and braking device, the extremely rapid control motion is brought to a standstill in the end position of the device without undue hunting and without excessive development of heat.

The energy accumulator drives the movable part of the variable resistance device preferably through a multiplication or step-up transmission. The addition of such a transmission seems to have the disadvantage of increasing the masses to be moved and thereby to render difficult attaining a speed of the desired high value. However, under the present particular conditions, the reduction in mass of the energy accumulator afforded by the use of the step-up transmission outweighs the additional mass of the transmission, since the latter may be designed as a simple lever, preferably as a single-armed (i. e., third class) lever of relatively small mass. The energy accumulator proper consists preferably of a spring. It is the mass of the spring which constitutes the main cause for the inertia in connection with drives operating at high speeds. Consequently, the shorter the travel of the spring resulting from the choice of the transmission, the smaller the work of acceleration to be expended on the spring mass, and the more energy is free for the acceleration of the movable part of the variable resistance device.

The accompanying drawing illustrates some embodiments of the invention in diagrammatic form.

Fig. 1 is a sectional view of a control apparatus which contains a helical spring serving as an energy accumulator for actuating the movable part of a resistance device.

Fig. 2 is a similar view of the second embodiment and shows a torsional spring used as an energy accumulator.

Fig. 3 is a top view of the apparatus of Fig. 2, and

Fig. 4 shows a third embodiment.

In the apparatus shown in Fig. 1, a resistance body $w$ is embedded in an insulating base plate $i$ and contacted by a slide contact $s$ which in order to effect the switching operation is to be displaced at a high speed in the direction of the arrow $c$ from one end position to the other. A frame $a$ is mounted on the base plate $i$. The contact $s$ is guided in the frame $a$ by means of one or more rollers $r$, and is connected through a single armed lever $h$ with one end of a helical spring $f$ whose other end is connected by a bolt $e$ with the frame $a$. The spring acts on the lever $h$ with a small lever arm so that its movable end, when in operation, travels only a short distance as compared with the travel of the movable part $s$. $b$ is a pin forming the fulcrum of lever $h$. The spring $f$ has a few windings of large cross section. In this manner the natural frequency of the spring may assume such a high value that no disturbing oscillations occur at the required speed at which the movement is effected. The tension of the spring may be regulated by rotating the bolt $e$.

In order that the parts of the device do not come into engagement with one another under sudden blows at the end of the movement, the drive is so arranged according to the invention that the spring is unstressed in its central position and acts in the first portion of the control motion as a driving spring and in the second portion thereof as a braking spring to overcome the inertia of moving parts. The movable contact $s$ or the drive is latched in each end position by a catch $k_1$ or $k_2$ which must be released in order to initiate the next control motion. In same cases, the latching in one end position is sufficient so that the other catch may be dispensed with.

The apparatus operates as follows. The contact s and the resistor w are connected in the circuit to be controlled so that the effective resistance of the device is smallest in the position illustrated and increases rapidly to a very high value when the contact moves towards the other end position. In the illustrated position, the spring f is stressed. In order to effect a control action, the catch $k_1$ is released by actuating the appertaining lever k manually or by magnetic or the like control means. As a result, the spring f contracts and moves the lever h and the contact s rapidly in the direction of the arrow c. When the contact s reaches about the midpoint of its travel, the spring f is unstressed and from now on acts as a brake, thus decelerating the travel of the contact s until the latter reaches the end point of its control movement. The catch $k_2$ comes into action and blocks the return movement of the contact s. Now, the resistance of the apparatus is so high that the current in the control circuit is negligible or of sufficiently low intensity to be finally interrupted by a simple auxiliary switch. In order to reset the apparatus, the catch $k_2$ must be released and the spring f reloaded. This may be done by hand or with the aid of any known drive, for instance, of an electromagnet or a compressed air piston as customary for resetting overload breakers (see also Fig. 4 showing a similar device).

Instead of the helical spring f shown in Fig. 1, a resilient rod may be employed which is in engagement with the pin b of the lever h. Also in this case, the force of the spring is transmitted to the movable part of the device with a great step-up ratio. The resilient rod has the advantage that its inertia is very small.

The apparatus illustrated in Figs. 2 and 3 represents an example of the last-mentioned type. As apparent from the drawing and indicated by the use of like reference letters for like elements, the second embodiment is similar to that of Fig. 1, except that the helical spring (f in Fig. 1) is replaced by a rod t whose ends are connected through holders g with the frame a and whose center forms the fulcrum of lever h. The rod t forms a torsional spring. The operation of this embodiment is similar to that of the first embodiment.

Apparatus according to the invention are also suitable for a periodic operation so as to effect a corresponding periodic control of the power circuit. Fig. 4 exemplifies an embodiment of this type. A magnet m serves to periodically reload the energy accumulator and is energized periodically in a proper rhythm or frequency.

What is claimed is:

1. In an apparatus for rapidly and continuously inserting a high resistance into an electric power circuit, a device of continuously variable effective resistance, having a resistor and a contact movable over and in contact with said resistor in a smooth uninterrupted path, a spring for moving said contact, means connecting a movable point of said spring with said contact such that the range of movement of said contact is substantially greater than that of said point, means for supporting said spring such that said spring is unstressed when said contact is at an intermediate point of said path and oppositely stressed at opposite sides of said point, said contact when released from one end of said path being moved by said spring to such intermediate point and the inertia of moving parts being such as to carry said contact well beyond said intermediate point and to the opposite end of said path, and means for moving said contact to said one end of said path, holding the same at said end and releasing the same.

2. In an apparatus for rapidly and continuously inserting a higher resistance into an electric power circuit, a device of continuously variable effective resistance having a resistor and a contact movable over and in contact with said resistor in a smooth uninterrupted path, a rod forming a torsion spring for moving said contact, means connecting a movable point of said spring with said contact such that the range of movement of said contact is substantially greater than that of said point, means for supporting said spring such that said spring is unstressed when said contact is at an intermediate point of said path and oppositely stressed at opposite sides of said point, said contact when released from one end of said path being moved by said spring to such intermediate point and the inertia of moving parts being such as to carry said contact well beyond said intermediate point and to the opposite end of said path, and means for moving said contact to said one end of said path, holding the same at said end and releasing the same.

3. In an apparatus for rapidly and continuously inserting a high resistance into an electric power circuit, a device of continuously variable effective resistance, having a resistor and a contact movable over and in contact with said resistor in a smooth uninterrupted path, a spring for moving said contact, means connecting a movable point of said spring with said contact such that the range of movement of said contact is substantially greater than that of said point, means for supporting said spring such that said spring is unstressed when said contact is at an intermediate point of said path and oppositely stressed at opposite sides of said point, said contact when released from one end of said path being moved by said spring to such intermediate point and the inertia of moving parts being such as to carry said contact well beyond said intermediate point and to the opposite end of said path, and intermittently operated means for moving said contact to said one end of said path, holding the same at said end and releasing the same.

4. In an apparatus for rapidly and continuously inserting a high resistance into an electric power circuit, a device of continuously variable effective resistance, having a resistor and a contact movable over and in contact with said resistor in a smooth uninterrupted path, a spring for moving said contact, means connecting a movable point of said spring with said contact such that the range of movement of said contact is substantially greater than that of said point, means for supporting said spring such that said spring is unstressed when said contact is at an intermediate point of said path and oppositely stressed at opposite sides of said point, said contact when released from one end of said path being moved by said spring to such intermediate point and the inertia of moving parts being such as to carry said contact well beyond said intermediate point and to the opposite end of said path, and a releasable catch for holding said contact at said one end of the path.

5. In an apparatus for rapidly and continuously inserting a high resistance into an electric power circuit, a device of continuously variable effective resistance, having a resistor and a contact movable over and in contact with said resistor in a smooth uninterrupted path, a spring for moving said contact, means connecting a movable point of said spring with said contact such that the range of movement of said contact is substantially greater than that of said point, means for supporting said spring such that said spring is unstressed when said contact is at an intermediate point of said path and oppositely stressed at opposite sides of said point, said contact when released from one end of said path being moved by said spring to such intermediate point and the inertia of moving parts being such as to carry said contact well beyond said intermediate point and to the opposite end of said path, a releasable catch for holding said contact at said one end of the path, and a second releasable catch for holding said contact at the opposite end of said path.

WILHELM PUTTFARCKEN.